United States Patent
Brown et al.

(10) Patent No.: US 11,969,930 B2
(45) Date of Patent: Apr. 30, 2024

(54) EXTRUSION PROCESS AND ASSEMBLY FOR PRODUCING A ROOF DITCH MOLDING HAVING A BRIGHT FILM EXTERIOR LAYER

(71) Applicant: U.S. Farathane Corporation, Auburn Hills, MI (US)

(72) Inventors: Timothy John Brown, Bruce Township, MI (US); Kevin Charles Baxter, Goodrich, MI (US); Gerald N. Strich, North Branch, MI (US)

(73) Assignee: Bank of America, N.A., As Administrative Agent, Dallas, TX (US)

( * ) Notice: Subject to any disclaimer, the term of this patent is extended or adjusted under 35 U.S.C. 154(b) by 377 days.

(21) Appl. No.: 17/529,488

(22) Filed: Nov. 18, 2021

(65) Prior Publication Data

US 2022/0072754 A1   Mar. 10, 2022

Related U.S. Application Data

(63) Continuation-in-part of application No. 17/186,271, filed on Feb. 26, 2021.
(Continued)

(51) Int. Cl.
*B29C 48/21* (2019.01)
*B29C 48/00* (2019.01)
(Continued)

(52) U.S. Cl.
CPC .......... *B29C 48/21* (2019.02); *B29C 48/0013* (2019.02); *B29C 48/022* (2019.02);
(Continued)

(58) Field of Classification Search
CPC ....... B29C 48/21; B29C 48/022; B29C 48/12; B29C 48/911; B29C 48/0013; B29L 2031/3011; B60K 13/04
See application file for complete search history.

(56) References Cited

U.S. PATENT DOCUMENTS 3,423,231 A   1/1969   Utzmann
6,333,094 B1  12/2001  Schneider et al.
(Continued)

FOREIGN PATENT DOCUMENTS

CN   204451191 U   7/2015
EP   1938968 B1    9/2011
(Continued)

*Primary Examiner* — Robert B Davis
(74) *Attorney, Agent, or Firm* — Dinsmore & Shohl LLP

(57) ABSTRACT

An extrusion process for creating a roof ditch molding including forming a main body from a plastic material in a first stage extrusion, conveying the main body through a stacked array of die plates and into a first stage cooling tank, and communicating the main body from an outlet of the first stage cooling tank to a second stage extruder with crosshead die for applying a skim film bonding layer to the main body. Additional steps include applying a decorative layer over the skim bonding layer, communicating the main body to a third stage extruder with cross head die for applying wing portions in partially overlapping fashion along opposite side edges of the decorative layer and drawing the completed ditch molding through a second stage cooling tank prior to conducting one or more finishing operations.

8 Claims, 9 Drawing Sheets

Related U.S. Application Data

(60) Provisional application No. 63/118,076, filed on Nov. 25, 2020, provisional application No. 62/989,973, filed on Mar. 16, 2020.

(51) Int. Cl.
  B29C 48/12 (2019.01)
  B29C 48/88 (2019.01)
  B29K 23/00 (2006.01)
  B29L 31/30 (2006.01)
  B60R 13/04 (2006.01)

(52) U.S. Cl.
  CPC ............ B29C 48/12 (2019.02); B29C 48/911 (2019.02); *B29K 2023/12* (2013.01); *B29L 2031/3011* (2013.01); *B60R 13/04* (2013.01)

(56) References Cited

U.S. PATENT DOCUMENTS

| | | |
|---|---|---|
| 8,657,370 B1 | 2/2014 | Pierce et al. |
| 8,783,751 B2 | 7/2014 | Bland et al. |
| 8,955,896 B2 | 2/2015 | Baxter et al. |
| 8,974,619 B1 | 3/2015 | Mitchell et al. |
| 9,162,387 B2 | 10/2015 | Porter et al. |
| 9,707,591 B1 | 7/2017 | Mitchell et al. |
| 9,744,710 B2 | 8/2017 | Porter et al. |
| 10,052,808 B2 | 8/2018 | Porter et al. |
| 10,071,522 B2 | 9/2018 | Porter et al. |
| 10,179,435 B2 | 1/2019 | Porter et al. |
| 10,183,634 B1 | 1/2019 | Karmo et al. |
| 10,357,909 B2 | 7/2019 | Hicks et al. |
| 11,597,131 B2 * | 3/2023 | Baxter ................... B32B 27/32 |
| 2008/0210369 A1 | 9/2008 | Nicola et al. |
| 2008/0226866 A1 | 9/2008 | Vilcek et al. |
| 2009/0121378 A1 | 5/2009 | Ellis |
| 2010/0021737 A1 | 1/2010 | Beck et al. |
| 2014/0227485 A1 | 8/2014 | Gao |
| 2016/0046056 A1 * | 2/2016 | Schoonover ........ B29C 48/0022 156/221 |
| 2017/0305245 A1 | 10/2017 | Lux et al. |
| 2018/0229480 A1 | 8/2018 | Chung |
| 2019/0016276 A1 * | 1/2019 | Karmo .................. B62D 25/06 |
| 2019/0084285 A1 | 3/2019 | Weissenberger |

FOREIGN PATENT DOCUMENTS

| | | |
|---|---|---|
| GB | 2333990 A | 11/1999 |
| JP | 2020152190 A | 9/2020 |

\* cited by examiner

EXTRUSION PROCESS AND ASSEMBLY FOR PRODUCING A ROOF DITCH MOLDING HAVING A BRIGHT FILM EXTERIOR LAYER

CROSS REFERENCE TO RELATED APPLICATIONS

The present application claims the priority of U.S. Ser. No. 63/118,076 filed Nov. 25, 2020. The present application also is a continuation-in-part of U.S. Ser. No. 17/186,271 filed Feb. 26, 2021. The '271 application claims the priority of U.S. Ser. No. 62/989,973 filed Mar. 16, 2020.

FIELD OF THE INVENTION

The present invention discloses a multi-stage extrusion processes for creating a roof ditch molding exhibiting a bright film exterior layer.

BACKGROUND OF THE INVENTION

The prior art is documented with multi-stage extrusion processes and assemblies. Examples of these include the process and assembly for creating an elongated geothermal pipe as disclosed in each of U.S. Pat. Nos. 9,162,387, 9,744,710 and 10,052,808, all issued to Porter et al. In each example, a multi-stage extrusion process is employed for creating an elongated article exhibiting a desired finished cross sectional profile. In the further instance of the U.S. Pat. No. 10,052,808 patent, a second extrusion stage cross head operation is combined with one more of the individual extrusion steps for joining together such as a pair of outer lobes to a central first stage extruded sleeve.

Other prior art references teach applying a decorative film to a roof panel or the like. In the example of JP 2020152190, a roof panel is provided with an exteriorly attachable and peel away decorative film. In the further example of Hicks, U.S. Pat. No. 10,357,909, a thermoset in-mold finishing film is applied to such as automotive body panels, such as during a reaction injection molding operation.

SUMMARY OF THE PRESENT INVENTION

The present invention discloses an extrusion process for creating a roof ditch molding including forming a main body from a plastic material in a first stage extrusion, conveying the main body through a stacked array of die plates and into a first stage cooling tank, and communicating the main body from an outlet of the first stage cooling tank to a second stage extruder with crosshead die for applying a skim film bonding layer to the main body. Additional steps include applying a decorative layer over the skim bonding layer, communicating the main body to a third stage extruder with cross head die for applying wing portions in partially overlapping fashion along opposite side edges of the decorative layer and drawing the completed ditch molding through a second stage cooling tank prior to conducting one or more finishing operations.

Additional steps include forming the main body from a polypropylene material and forming the wing portions from a thermoplastic vulcanizate material. Also included is the step of arranging a plurality of linearly spaced sizing dies with communicating fluid vacuum assist lines within the first stage cooling tank. The step of forming the skim film bonding layer further includes forming from a thermoplastic vulcanizate material.

Other steps include pulling the first stage extrusion upon exiting each of the first and second stage cooling tanks and sectioning the completed ditch molding into individual lengths. The decorative layer can further be provided as any of a bright film, plastic or other class A surface material.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With referenced to the attached illustrations, the present invention discloses a multi-stage extrusion process and assembly. As previously described, the process and assembly utilizes one or more cross head dies for producing a roof ditch molding which incorporates a bright film layer, such as applied in an intermediate extrusion step to an exposed surface of a previously extruded ditch molding body, and following which a secondary cross head die operation adds wing portions in partially overlapping fashion along exposed edges of the bright film layer, and in order to prevent delamination. As will be also described, additional steps include first and second stage cooling tanks in combination with extrusion pulling stations and an end stage cutter for sectioning the finished roof ditch molding into a desired length.

Figure 1:
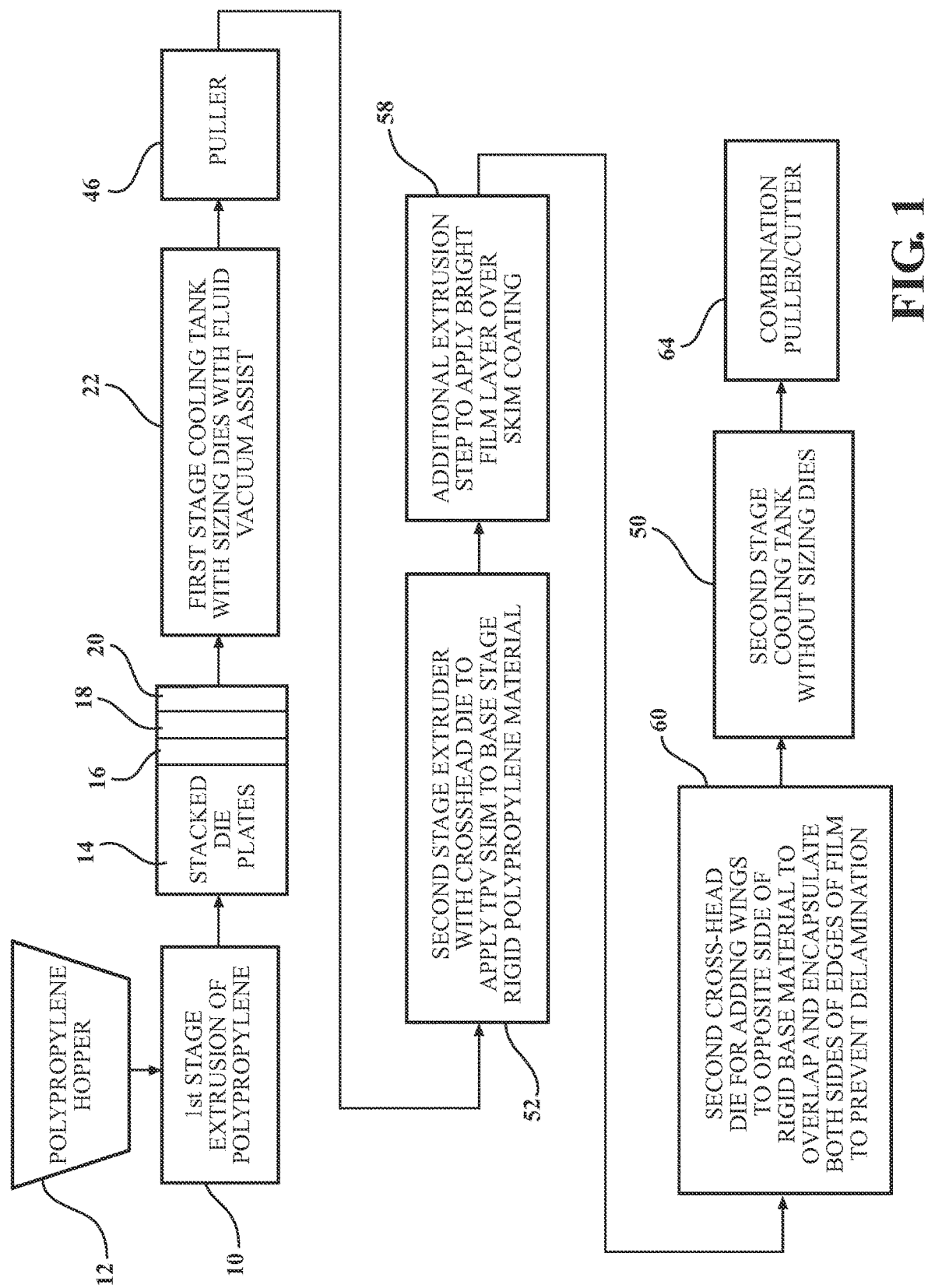
FIG. 1 is a schematic view of the process steps for producing the extruded roof ditch molding with the bright film layer according to the present invention.
Figure 1A:
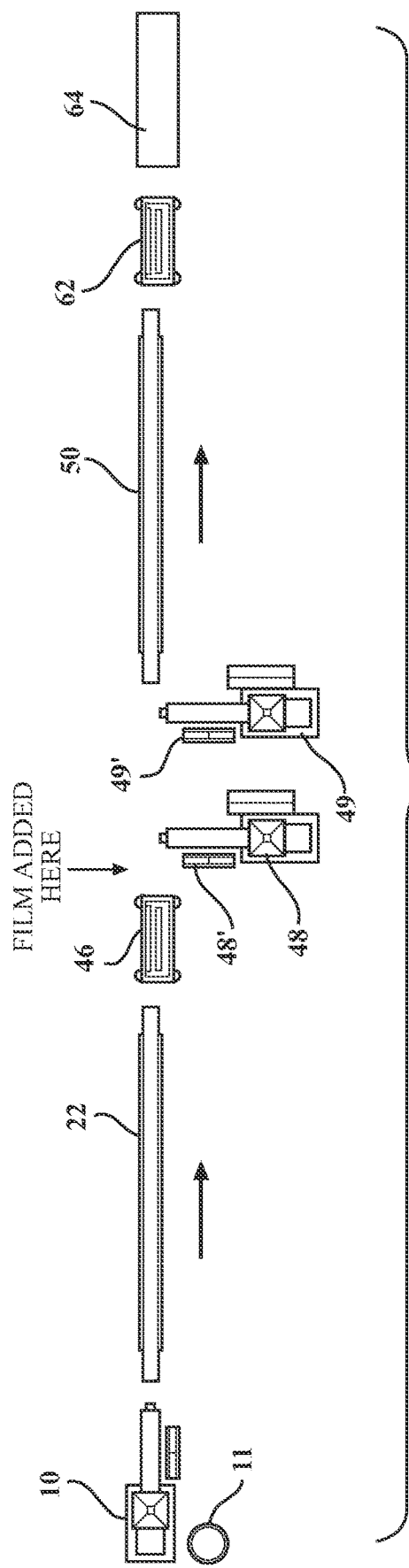
FIG. 1A is a corresponding line schematic to FIG. 1 and depicting the three stage cross head die with bright film layer application steps.

Referring to FIG. 1 a schematic view is provided of the process steps for producing the extruded roof ditch molding with the bright film layer according to the present invention. FIG. 1A provides a corresponding line schematic with the multi-cross head die stations. FIGS. 2-12 depict individual representations of each of the sequential steps identified in FIG. 1 for forming the roof ditch molding of the present invention.

Figure 11:
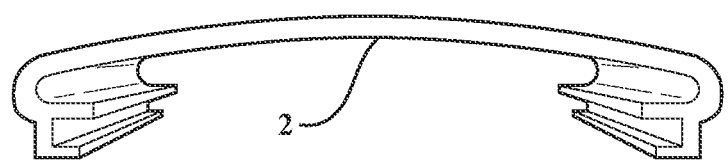
FIG. 11 is an illustration of the semi-rigid first stage main body extrusion prior to application of the TPV skim, bright film layer and subsequent cross-head die applied side wings.
Figure 13:
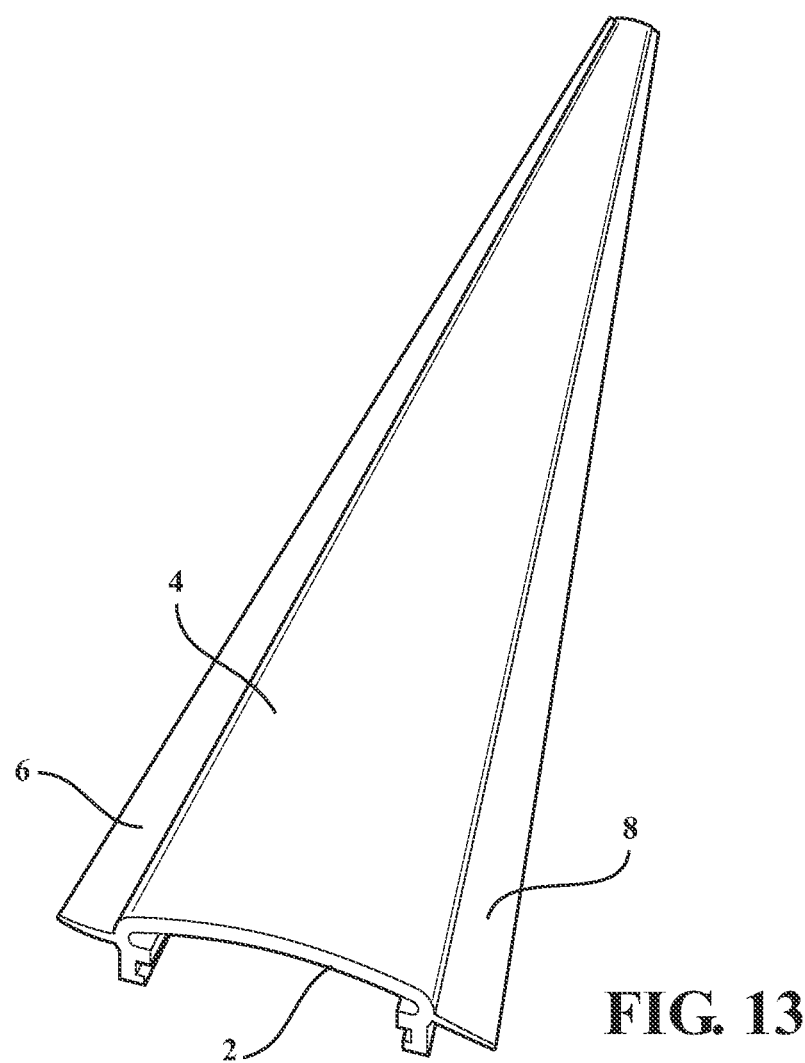
FIG. 13 is an illustration of a finished roof ditch molding including each of the base PP rigid material, TPV skim, bright film layer and cross head die applied side wings.

FIG. 11 further provides an illustration of a semi-rigid first stage main body extrusion 2 (see also FIG. 15), such as prior to application of a TPV skim 3 (see FIG. 16), an applied decorative layer (e.g. bright film layer at 4 in FIG. 13 and which is also interpreted to include any class A grade vehicle decorative material) and subsequent cross-head die applied side wings associated with the finished roof ditch molding. FIG. 13 further depicts the finished roof ditch molding in which the first stage extrusion 2 is succeeded by the TPV skim layer (not shown), the bright film layer 4 and the side wings 6 and 8.

Figure 14:
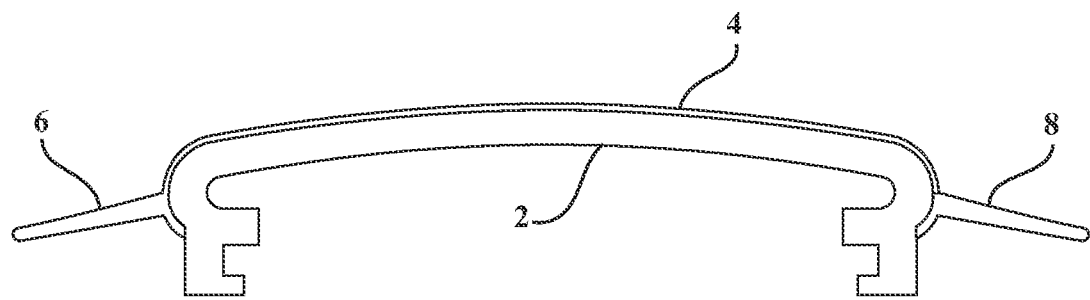
FIG. 14 is an end plan view of a finished roof ditch molding.
Figure 15:
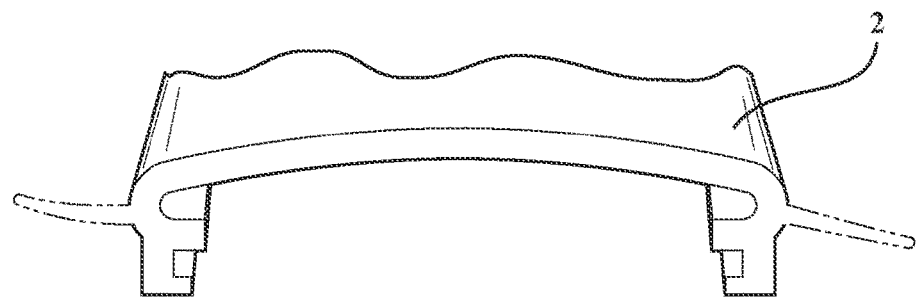
FIGS. 15-17 present a series of end perspective views of the roof ditch molding at each of initial profile extrusion stage (FIG. 15), intermediate film application stage (FIG. 16) and subsequent softer side wing extrusion stage (FIG. 17).
Figure 16:
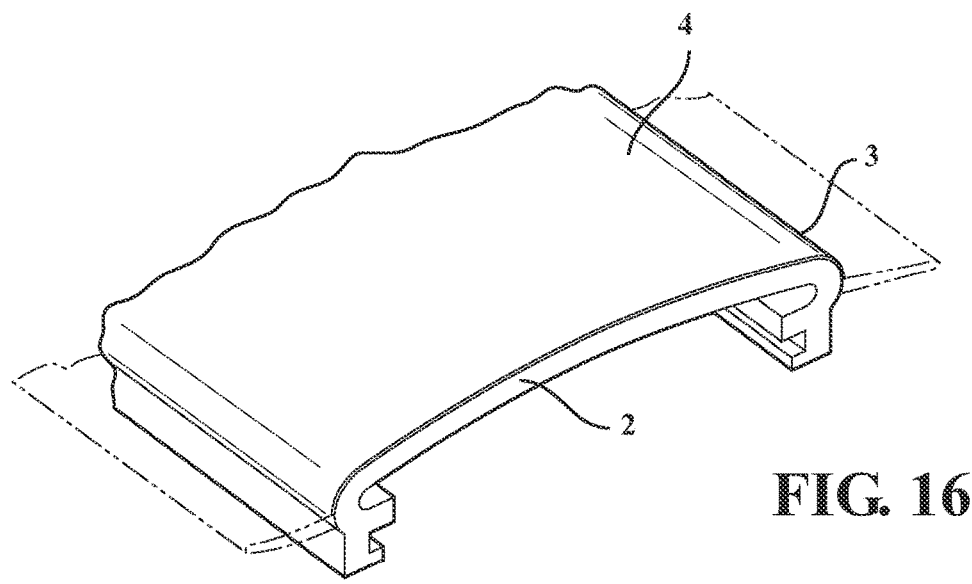
Figure 17:
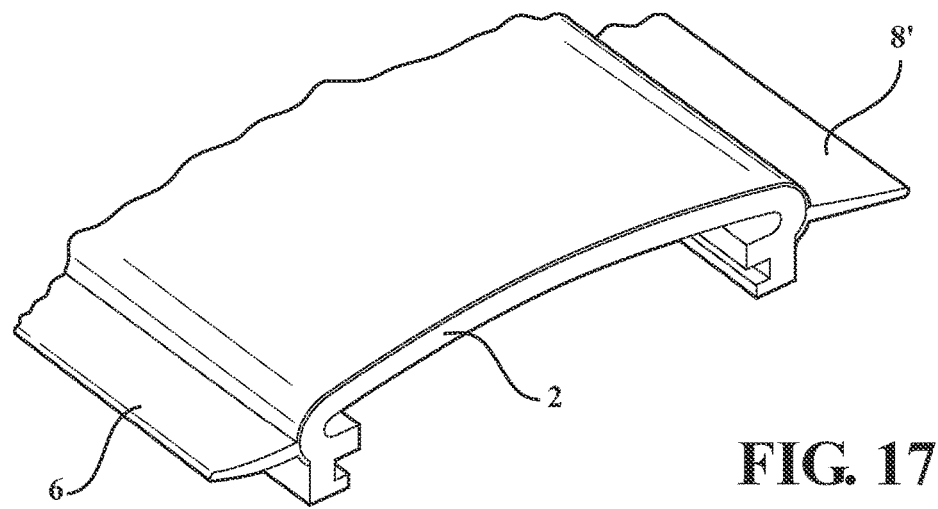

FIG. 14 is an end plan view of a finished roof ditch molding, with FIGS. 15-17 presenting a series of end perspective views of the roof ditch molding at each of initial profile extrusion stage (FIG. 15), intermediate film application stage (FIG. 16) and subsequent softer side wing extrusion stage (FIG. 17).

Referring again to FIGS. 1 and 1A, a first stage extruder is shown at 10 which is fed by a hopper 12, such as which can supply a pelletized material not limited to a polypropylene. See also FIG. 2 which provides an illustration of the first stage extruder 10 (FIG. 1A further showing a corresponding dryer 11 for the first stage extruder) for producing the main body portion 2 of the roof ditch molding, the material content of which can include without limitation a polypropylene material. The main extruder 10 is of a conventional construction and includes an extrusion die 14 configured at an outlet thereof.

Figure 2:
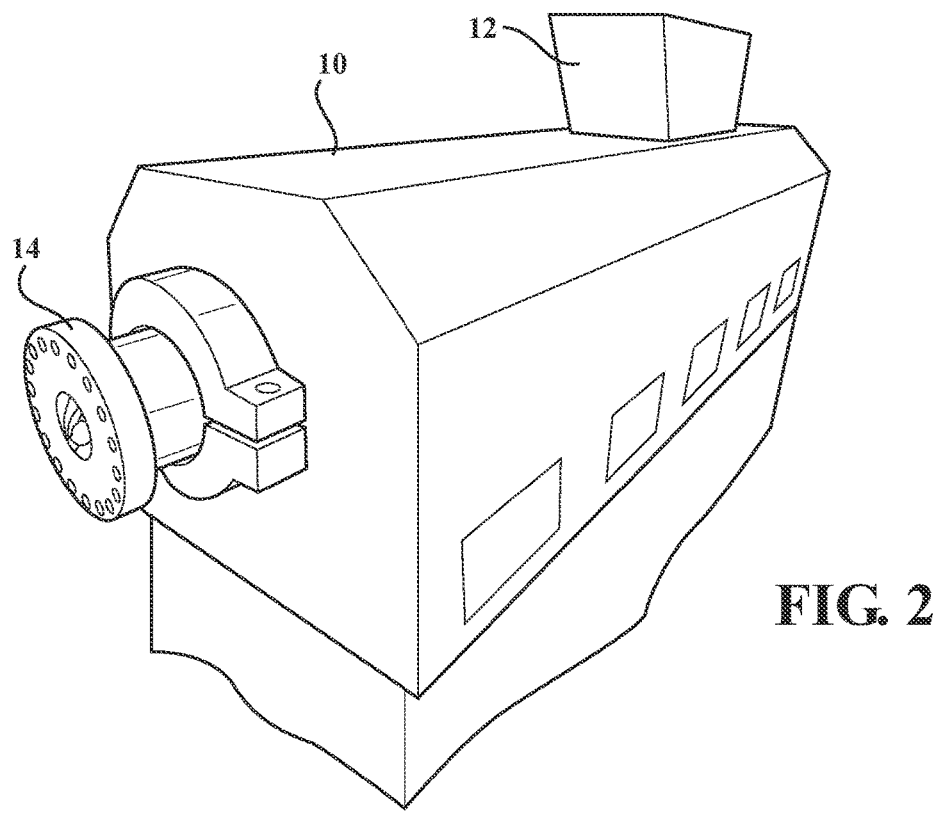
FIG. 2 is an illustration of a first stage extruder for producing a main body portion of the roof ditch molding, such as without limitation from a polypropylene material.
Figure 3:
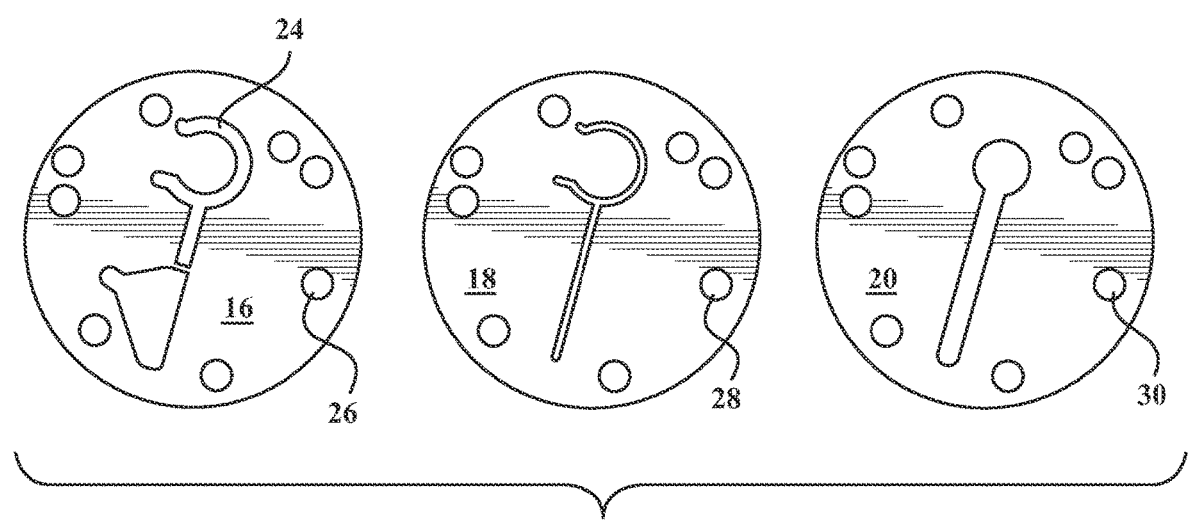
FIG. 3 is an illustration of a plurality of stacked die plates which are arranged between the first stage main extruder of FIG. 2 and a first stage cooling tank with sizing dies.
Figure 4:
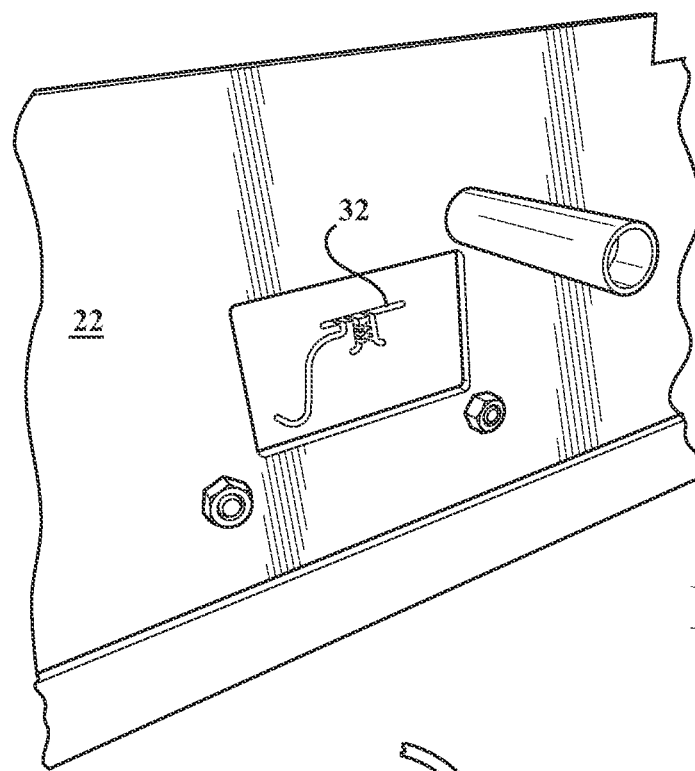
FIG. 4 is a succeeding illustration of an inlet side of the first stage cooling tank which is communicated by the stack of sizing dies extending from the first stage main extruder.
Figure 5:
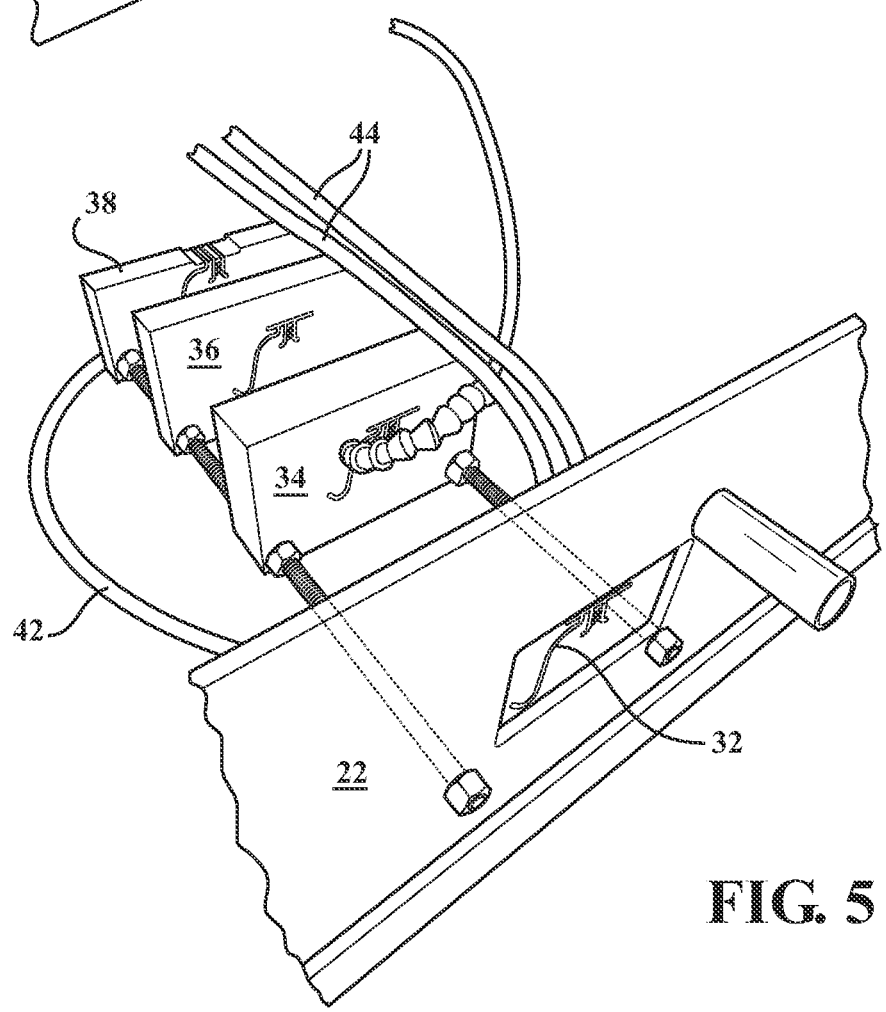
FIG. 5 is an elevation view of the first stage cooling tank and further illustrating the fluid vacuum assist sizing dies for forming and solidifying the first stage polypropylene extrusion.

FIG. 3 is an illustration of a plurality of stacked die plates 16, 18, 20, et. seq. which are arranged between the first stage main extruder 10 of FIG. 2 and a first stage cooling tank 22 (see FIGS. 4-5). The die plates are constructed of a suitable grade steel material and each includes a cross sectional aperture pattern (see as depicted at 24 for associated die plate 16 in FIG. 3). The stacked array of plates each include mounting or guide apertures (see at 26, 28, and 30 respectively for plates 16, 18 and 20) and are bolted both together and to each of the outlet die 14 of the first stage extruder 10 and an inlet cross sectional aperture profile 32 (see again FIG. 4) of the first stage cooling tank 22 in order to create a continuous profile channel for the first stage extruded polypropylene or like material to be extruded and initially formed prior to delivery to the first stage cooling tank 22.

FIG. 4 is a succeeding illustration of an inlet side of the first stage cooling tank 22 with communicating inlet profile 32 and to which is communicated the initial base extrusion 2 via the stack of sizing dies 16, 18, 20, et. seq. extending between he first stage main extruder 10 and the first cooling tank 22. FIG. 5 is an elevation view of the first stage cooling tank 22 and further illustrating a linearly spaced and aligned arrangement of fluid vacuum assist sizing dies 36, 38 and 40 for forming and solidifying the first stage polypropylene extrusion.

The tank interior can be filled with a water or water based fluid solution, with the individual sizing dies 36-40 including connecting fluid vacuum assist lines (some of these being shown at 40, 42, 44 et seq.). The vacuum assist lines operate to provide for proper dimensioning and consistency in the sizing of the cross sectional first stage extruded main body 2 during its travel through the tank 22.

Figure 6:
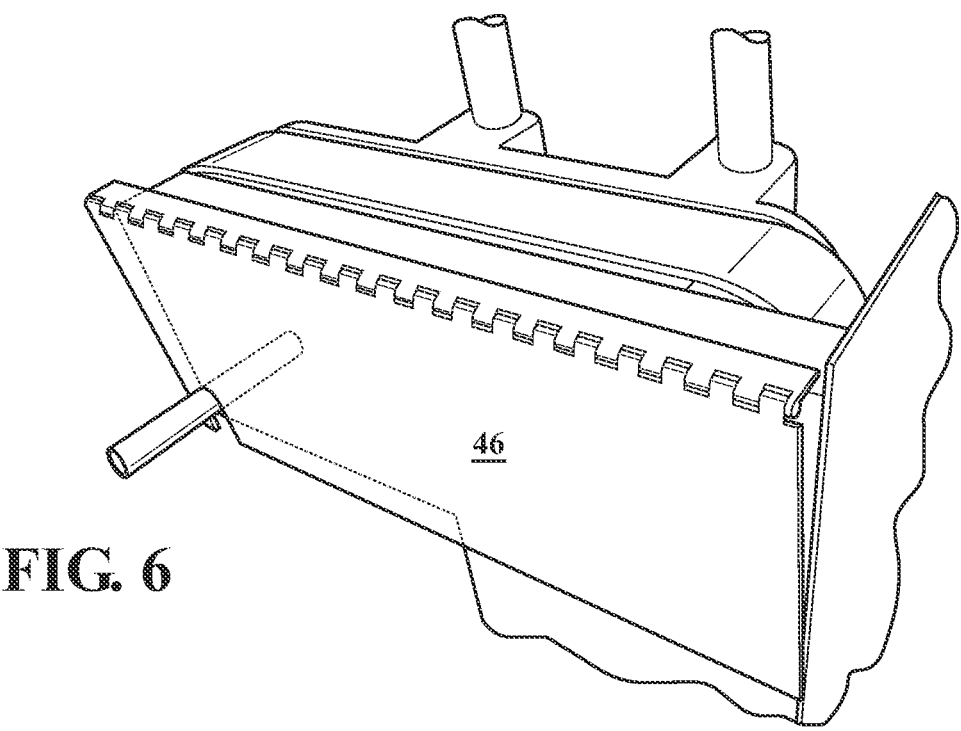
FIG. 6 is an illustration of a first puller station communicating with an exit location of the first stage cooling tank for linearly directing and maintaining structural integrity of the main body extrusion.
Figure 7:
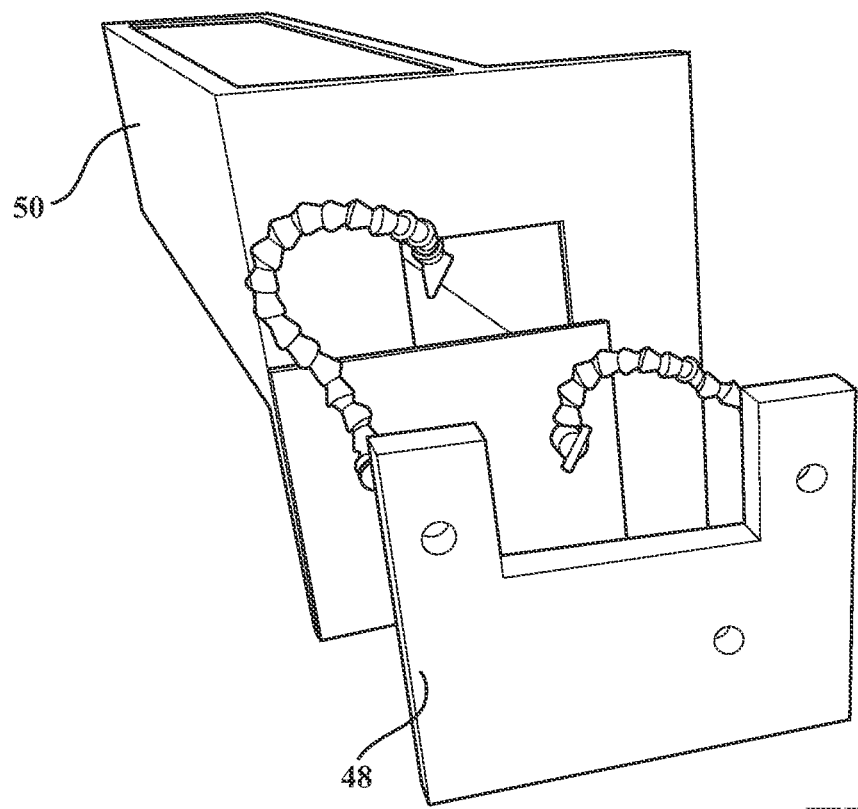
FIG. 7 is an illustration representative of second and third stage extrusion steps for applying each of the film bonding (skim) material and soft wing materials, this including second and third cross head die arrangements as referenced in FIG. 1A and second stage cooling tank located downstream from the first puller station.

Proceeding to FIG. 6, an illustration of a first puller station 46 is shown communicating with an exit location of the first stage cooling tank 22 (see again both process and line schematics of FIGS. 1 and 1A) for linearly directing and maintaining the structural integrity of the main body extrusion 2. FIG. 7 (in combination with FIG. 1A) provides an illustration of a pair of second stage extruder 48 and third stage extruder 49 with corresponding cross head dies, respectively at 48' and 49'. The second stage extruder 48 and corresponding cross head die 48' applies a film bonding (or skim) material to an upper surface of the main extruded body 2. The third stage extruder 49 and corresponding cross head die 49' provides the eventual soft wings of material (again at 6 and 8 in FIGS. 13-14).

Figure 8:
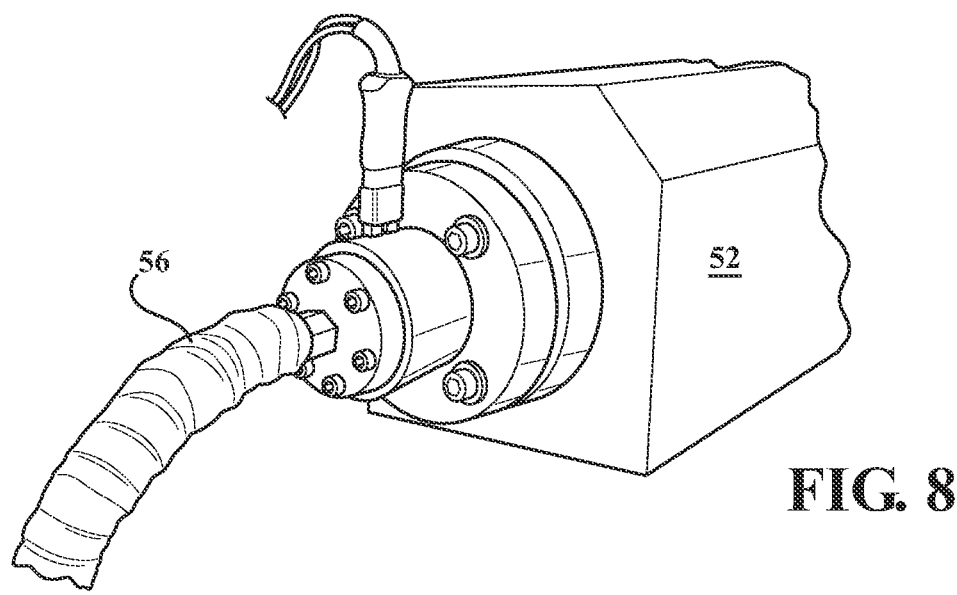
FIG. 8 is an illustration of a second stage extruder such as referenced in FIGS. 1A and 7 associated with the cross head die operation for applying the film bonding material including such as a thermoplastic vulcanizate (TPV) skim to the previously extruded base material.

A second stage cooling tank 50 (such as which likewise can be filled with a fluid and does not require sizing dies) is located downstream from the first puller station 46, second stage extruder/cross head die combination 48/48' and third stage extruder/cross head die combination FIG. 8 is an illustration of a second stage extruder 52 with outlet die 54 and feed line 56 associated with such as the second cross head die operation 48/48' for applying the film 3 (again FIG. 16), such as a thermoplastic vulcanizate (TPV) skim, to the previously extruded base material 2. Concurrent with the application of the film bonding material, the applied decorative layer (also the bright film layer 4 shown in FIG. 4) is applied to the exposed surface of the setting film. Without limitation, the bright film layer is interpreted to include any type of film or other A surface material not limited to a plastic or film material. Following the application of the bright film layer, the third stage extruder/cross head die applies the soft wing material (see wings 6 and 8)

Figure 9:
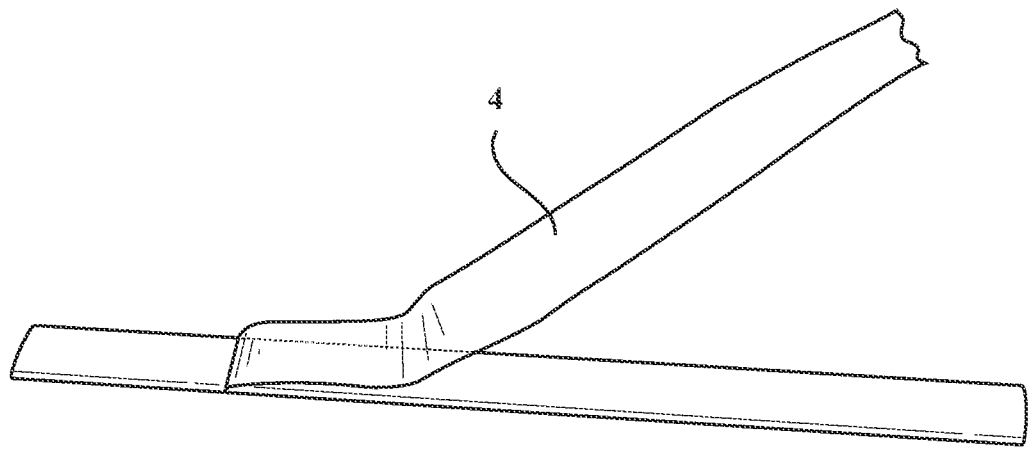
FIG. 9 is an illustration of a secondary cross head die operation following the application of the TPV skim and by which a bright film layer is applied over the skim coating.
Figure 10:
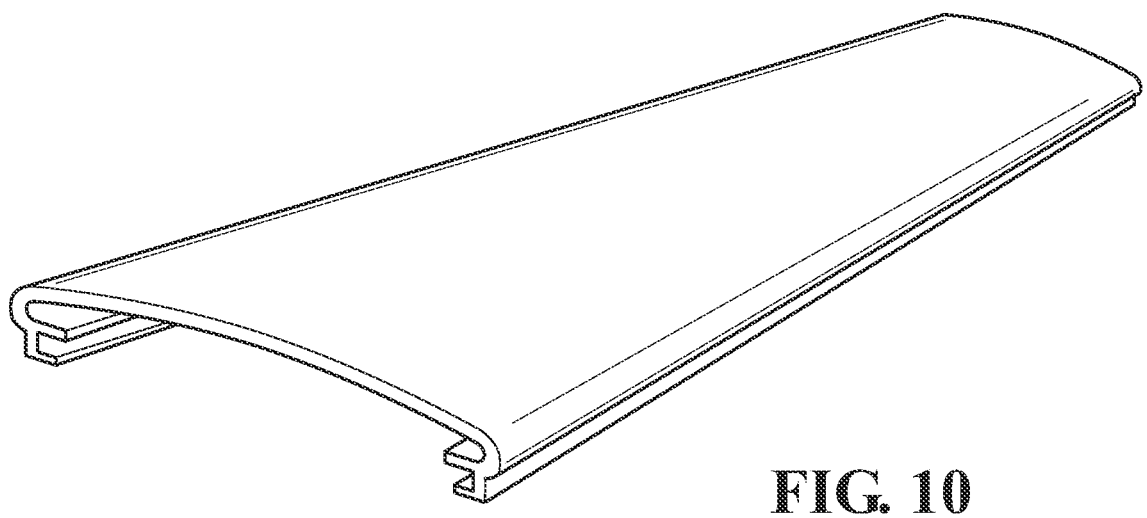
FIG. 10 is a representation of a succeeding cross head die operation for adding wing portions to opposite sides of the rigid base material in order to partially overlap and encapsulate opposite edges of the bright film layer in order to prevent delamination from the main body of the roof ditch extrusion.

FIG. 9 provides an illustration of the secondary cross head die operation 48/48', such following the application of the TPV skim 3, and by which the bright film layer 4 is applied over the skim coating, this further being schematically represented at 58 in FIG. 1. Proceeding to FIG. 10, and as further represented schematically 60 in FIG. 1, a second cross head die operation is provided following application of the bright film layer 4 for adding the pair of side wings (see again at 6 and 8 in FIG. 13). The side wings can again be of any suitable softer plastic material not limited to thermoplastic vulcanizate (TPV) or any suitable extruded plastic material and which, upon application (see again FIG. 17), partially overlays each of the opposite edges of the bright film layer 4 in order to prevent delamination.

Without limitation, the extruders and associated cross head dies can incorporate any desired arrangement of thermocouples and/or sensors for providing a consistent extruded profile having the desired characteristics and properties of the completed ditch molding. It is also envisioned and understood that the present process and assembly can be reconfigured to produce other elongated articles not limited to a roof ditch molding as described and illustrated.

Figure 12:
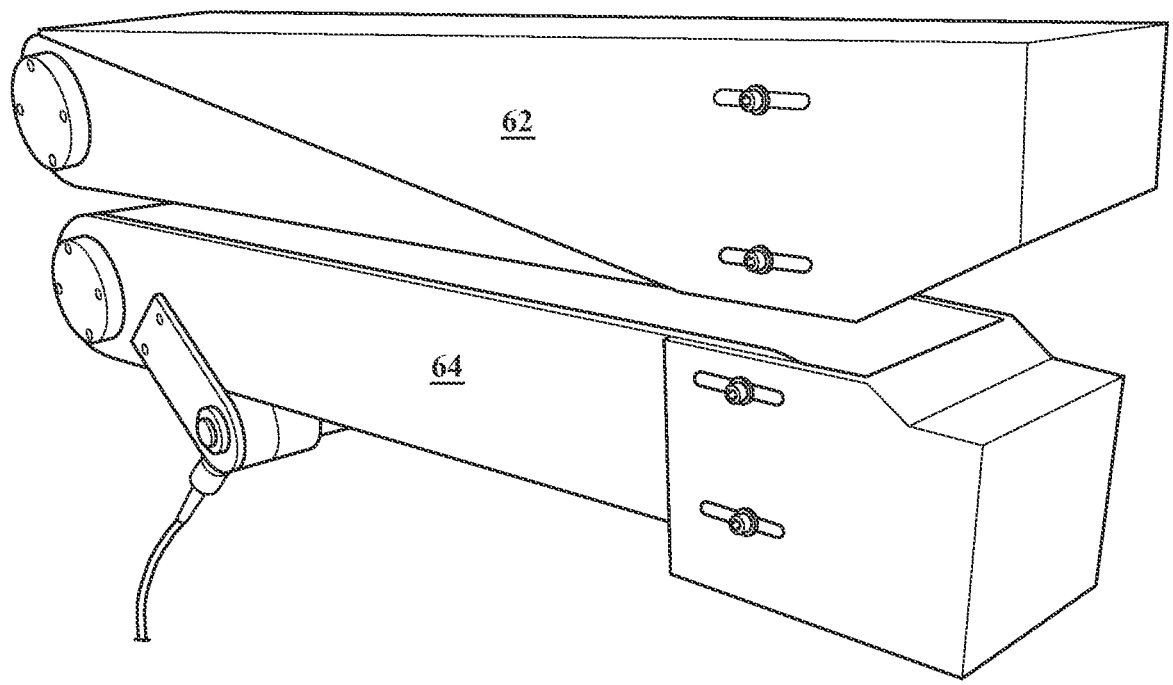
FIG. 12 presents a succeeding illustration of an end stage combination puller and cutter for sectioning individual lengths of the completed roof ditch extrusion.

FIG. 12 presents a succeeding illustration of an end stage combination puller 62, following which a cutter 64 (see again end stage eagle press in FIG. 1A) sections individual lengths of the completed roof ditch extrusion. This is again depicted in FIG. 13 is an illustration of a finished roof ditch molding with bright film layer produced according to the process and assembly of the present invention and which provides a class A surface without the need of separate paint transfer or other applications to provide a desired finish to the roof ditch molding.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. An extrusion process for creating a roof ditch molding, comprising the steps of:
   forming a main body from a plastic material in a first stage extrusion;
   conveying the main body through a stacked array of die plates and into a first stage cooling tank;
   communicating the main body from an outlet of the first stage cooling tank to a second stage extruder with crosshead die for applying a skim film bonding layer to the main body;
   applying a decorative layer over the skim bonding layer;
   communicating the main body to a third stage extruder with cross head die for applying wing portions in partially overlapping fashion along opposite side edges of the decorative layer; and
   drawing the completed ditch molding through a second stage cooling tank prior to conducting one or more finishing operations.

2. The process according to claim 1, further comprising the step of forming the main body from a polypropylene material.

3. The process according to claim 1, further comprising the step of forming the wing portions from a thermoplastic vulcanizate material.

4. The process according to claim 1, further comprising the step of arranging a plurality of linearly spaced sizing dies with communicating fluid vacuum assist lines within the first stage cooling tank.

5. The process according to claim 1, further comprising the step of forming the skim film bonding layer of a thermoplastic vulcanizate material.

6. The process according to claim 1, further comprising the step of pulling the first stage extrusion upon exiting each of the first and second stage cooling tanks.

7. The process according to claim 6, further comprising the step of sectioning the completed ditch molding into individual lengths.

8. The process according to claim 1, further comprising providing the decorative layer as any of a bright film, plastic or other class A surface material.

* * * * *